United States Patent
Pursifull et al.

(10) Patent No.: US 10,723,380 B2
(45) Date of Patent: Jul. 28, 2020

(54) SYSTEMS AND METHODS TO CONTROL STEERING OF A VEHICLE

(71) Applicant: Ford Global Technologies, LLC, Dearborn, MI (US)

(72) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/442,297

(22) Filed: Feb. 24, 2017

(65) Prior Publication Data
US 2018/0244310 A1    Aug. 30, 2018

(51) Int. Cl.
| | |
|---|---|
| *B62D 6/10* | (2006.01) |
| *B62D 6/02* | (2006.01) |
| *B62D 6/04* | (2006.01) |
| *B62D 6/00* | (2006.01) |
| *B62D 15/02* | (2006.01) |

(52) U.S. Cl.
CPC .............. *B62D 6/10* (2013.01); *B62D 6/008* (2013.01); *B62D 6/02* (2013.01); *B62D 6/04* (2013.01); *B62D 15/021* (2013.01)

(58) Field of Classification Search
CPC . B62D 6/10; B62D 6/008; B62D 6/02; B62D 6/04
See application file for complete search history.

(56) References Cited

U.S. PATENT DOCUMENTS

| | | | |
|---|---|---|---|
| 5,765,116 A | 6/1998 | Wilson-Jones et al. | |
| 5,979,581 A | 11/1999 | Ravani et al. | |
| 8,437,913 B2 | 5/2013 | Wang et al. | |
| 9,045,157 B2 | 6/2015 | Tamaizumi et al. | |
| 9,227,663 B2 | 1/2016 | Matsuno | |
| 2002/0035424 A1* | 3/2002 | Kaufmann | B62D 5/001 701/41 |
| 2003/0221898 A1* | 12/2003 | Yasui | B60T 8/1755 180/446 |
| 2006/0069489 A1* | 3/2006 | Chen | B60T 8/17554 701/70 |
| 2008/0109134 A1* | 5/2008 | Bolourchi | B62D 6/002 701/41 |
| 2010/0100284 A1* | 4/2010 | Kudo | B62D 15/025 701/42 |
| 2014/0238769 A1* | 8/2014 | Tamaizumi | B62D 6/04 180/446 |

FOREIGN PATENT DOCUMENTS

| | | |
|---|---|---|
| JP | 2006236238 | 9/2006 |
| JP | 2007022169 | 2/2007 |
| JP | 2007168660 | 7/2007 |

* cited by examiner

*Primary Examiner* — Imran K Mustafa
(74) *Attorney, Agent, or Firm* — Ray Coppiellie; Hanley, Flight & Zimmerman, LLC (57) ABSTRACT

Systems and methods to control steering of a vehicle are disclosed. An example system includes a first sensor to measure a tilt angle associated with a vehicle positioned on a road surface. The example system also includes a vehicle controller communicatively coupled to the first sensor to receive the tilt angle. In addition, the example system includes steering system communicatively coupled to the vehicle controller. The vehicle controller provides feedforward control data to the steering system based on the tilt angle. The steering system generates a first steering torque based on the feedforward control data.

22 Claims, 6 Drawing Sheets

SYSTEMS AND METHODS TO CONTROL STEERING OF A VEHICLE

FIELD OF THE DISCLOSURE

This disclosure relates generally to vehicle steering systems and, more particularly, to systems and methods to control steering of a vehicle.

BACKGROUND

Vehicles typically have automated controllers or systems capable of improving performance (e.g., relating to accelerating, braking, steering, etc.) of the vehicles during operations or maneuvers, such as increasing power or efficiency of combustion engines and/or reducing response time of braking or steering systems. Certain vehicle controllers may be communicatively coupled to sensors (e.g., accelerometers, transducers, etc.) to periodically measure or monitor characteristics associated with the vehicles (e.g., acceleration, fluid pressure, etc.) by receiving data via the sensors. These controllers can implement complex algorithms or equations to process the sensor data and relating to dynamic control theory (e.g., proportional-integral-derivative (PID) control theory). The vehicle controllers may facilitate control of vehicle systems based on the processed data by generating a control signal and transmitting the signal to operable control assemblies of the vehicle systems, such as valves, actuators, motors, etc. In recent years, these automated controllers have become more complex with advancements of more powerful processor architectures and continue to incorporate applications of control theory that previously were not feasible to implement.

SUMMARY

An example apparatus includes a first sensor to measure a tilt angle associated with a vehicle positioned on a road surface. A vehicle controller is communicatively coupled to the first sensor to receive the tilt angle. A steering system is communicatively coupled to the vehicle controller. The vehicle controller provides feedforward control data to the steering system based on the tilt angle. The steering system generates a first steering torque based on the feedforward control data.

An example method includes measuring a tilt angle associated with a vehicle positioned on a road surface via a first sensor. The method includes generating feedforward control data based on the tilt angle via a vehicle controller communicatively coupled to the first sensor. The method includes providing the feedforward control data to a steering system of the vehicle to generate a first steering torque based on the feedforward control data.

An example tangible machine-readable medium includes instructions, which when executed, cause a processor to at least determine a tilt angle associated with a vehicle positioned on a road surface via a first sensor. The first sensor is to measure the tilt angle. The instructions further cause the processor to provide feedforward control data to a steering system of the vehicle based on the tilt angle. The steering system is to generate a first steering torque based on the feedforward control data.

BRIEF DESCRIPTION OF THE DRAWINGS

Wherever possible, the same reference numbers will be used throughout the drawing(s) and accompanying written description to refer to the same or like parts.

DETAILED DESCRIPTION

Vehicles or automobiles (e.g., cars, trucks, etc.) typically have automated controllers or systems (e.g., anti-lock braking systems, active or adaptive steering systems, etc.) to provide and/or facilitate functions or control of the vehicles, such as initiating valves, actuators and/or motors to provide, for example, steering or braking for the vehicles during operation or maneuvers. These automated controllers or systems may be communicatively coupled to vehicle sensors (e.g., accelerometers, tachometers, transducers, etc.,) that provide sensor data corresponding to vehicle characteristics, parameters and/or performance during the operations or maneuvers.

In some examples, the vehicle controllers may analyze and/or process the sensor data to determine whether and/or how to execute certain feedback control (i.e., closed loop control) commands to compensate and/or correct undesired vehicle characteristics, parameters and/or performance. For example, a vehicle controller may implement complex algorithms or equations to analyze and/or process the sensor data and periodically (e.g., during time intervals) calculate or determine feedback control characteristics (e.g., proportional, integral and/or derivative terms) based on the sensor data. In some such examples, the feedback control commands can include time varying control signals or data, based on the calculated or determined control characteristics, to operate or control a pump, valve and/or motor (e.g., associated with a steering system). Typically, these feedback control commands have limited response time that may be defined by power or speed of a processing architecture of the vehicle controller. For example, a control cycle of the above-described vehicle controller may require a particular duration of time (e.g., 100 milliseconds, 500 milliseconds, etc.) between the calculated or determined control characteristics. As a result, the feedback control commands may require at least that duration of time to correct or compensate for undesired vehicle characteristics, parameters and/or performance.

During certain operating or driving conditions, such as driving along a non-level and/or a non-flat road surface (e.g., a crown or camber), a vehicle may experience undesired steering torque that causes the vehicle to veer turn and/or, more generally, travel along an undesired path. This type of undesired steering torque may be commonly referred to as steering pull. Typically, a driver of the vehicle rotates a steering wheel and/or applies a counteractive steering torque to the steering wheel to compensate and/or correct the steering pull to ensure the vehicle travels along a desired path (e.g., a straight path). This counteractive steering torque can require periodic, rapid and/or fluctuating rotations of the steering wheel and/or torque applied to the steering wheel to compensate and/or correct for the steering pull as the vehicle travels, which can be undesirable and uncomfortable for a driver of the vehicle or other vehicle occupants. Even traditional vehicle controllers that automatically adjust steering settings may fail to rapidly reduce, compensate and/or correct steering pull during vehicle operations or maneuvers, which leaves the drivers to manually provide inputs to a steering wheel.

The examples disclosed herein rapidly control, compensate and/or correct undesired steering pull of a steering system during operations or maneuvers of a vehicle and within a time interval that would have otherwise been unachievable. Examples disclosed herein periodically measure a tilt angle (e.g., via a sensor such as an accelerometer, gyroscope, etc.) associated with the vehicle positioned on and/or traveling along a road surface. Examples disclosed herein generate, via a vehicle controller, feedforward control commands, different from feedback control commands, to instantaneously control pumps, valves and/or motors of a steering system and/or, more generally, to control the steering system based on the measured tilt angle. In some such examples, a counteractive steering torque is generated via the steering system and based on the feedforward control commands to provide rapid control, compensation and/or correction with respect to reducing and/or eliminating undesired steering pull to enable the vehicle to travel along a desired path. In some examples, the vehicle controller adjusts or updates (e.g., periodically or continuously) the feedforward control command to enable the steering system to adjust or change a magnitude or strength of the counteractive steering torque based on a speed, brake fluid pressure and/or other characteristics or parameters of the vehicle. In some such examples, the vehicle controller may process and/or analyze data received via sensors of the vehicle to determine whether and/or how to adjust or update the feedforward control command. In other disclosed examples, the vehicle controller generates feedback control commands based on the processed and/or analyzed data to provide additional control for the steering system by enabling the steering system to generate an additional steering torque. In some such examples, a time varying strength and/or magnitude of the additional steering torque is facilitated by the vehicle controller and based on processed and/or analyzed data.

Figure 1:
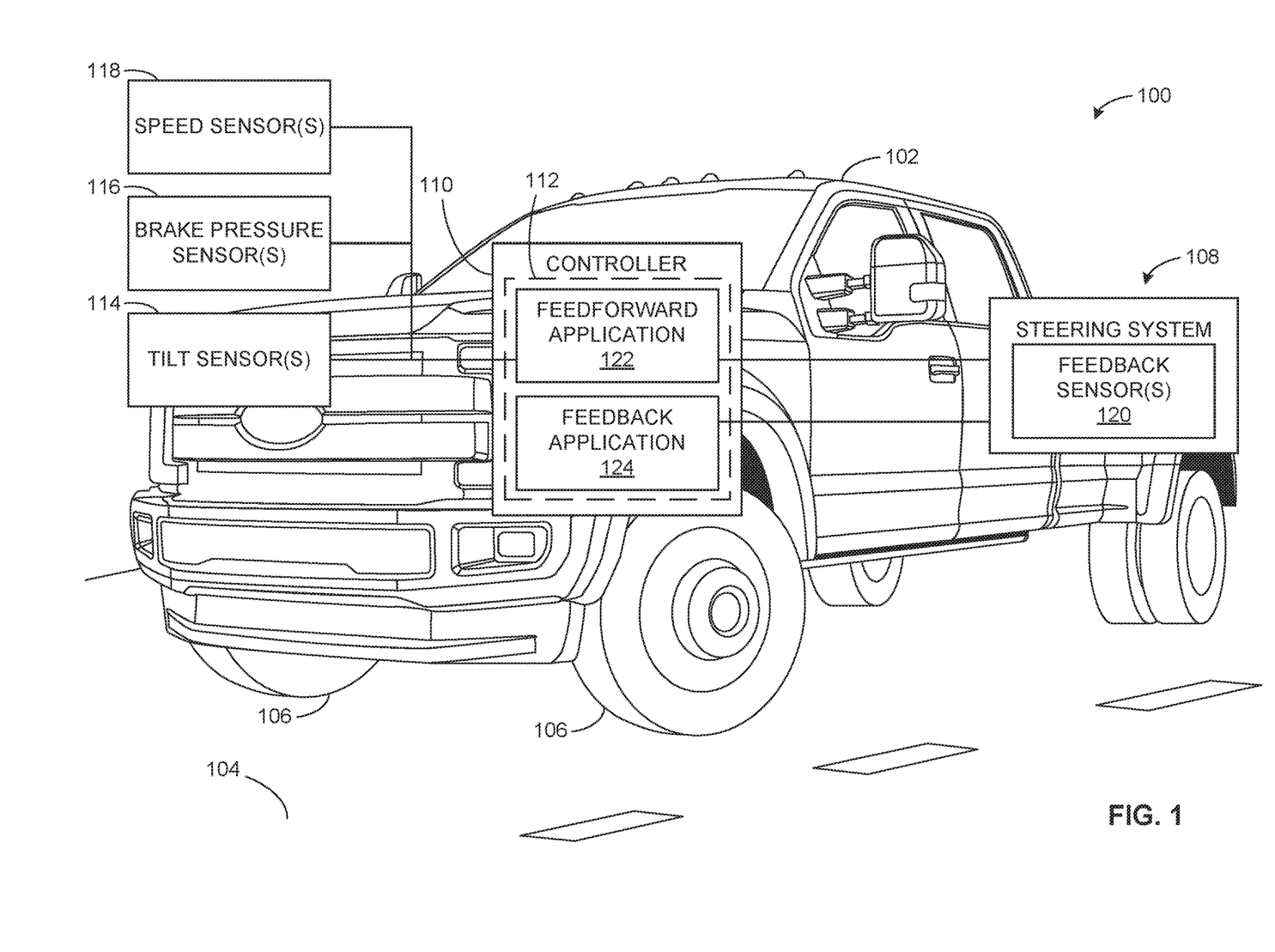
FIG. 1 is a schematic illustration of an example system including an example vehicle and an example vehicle controller that may implement methods and apparatus in accordance with the teachings of this disclosure.

FIG. 1 is a schematic illustration of an example system 100 in accordance with the teachings of this disclosure. The example system 100 includes an automobile or vehicle (e.g. a car, a truck, a van, etc.) 102 positioned on and/or traveling along a road surface 104. The vehicle 102 includes wheel assemblies 106 associated with steering the vehicle 102 and that contact the road surface 104. In this example, the leftmost wheel assemblies 106 (in the orientation of FIG. 1) are associated with steering and/or changing a direction or path of the vehicle 102 as the vehicle 102 travels along the road surface 104. In other examples, the vehicle 102 includes other wheel assemblies 106 associated with steering (e.g., a vehicle 102 having rear or all-wheel steering capability). In this example, the wheel assemblies 106 are operated and/or controlled by a steering system 108 of the vehicle 102, which is explained in greater detail below in connection with FIG. 3. Generally, the wheel assemblies 106 rotate and, thus, steer the vehicle 102 in response to steering torque received and/or transmitted via the steering system 108 and/or the road surface 104 (i.e., undesired steering torque). In some examples, a driver of the vehicle 102 provides an input to the steering system 108 (e.g., rotating a steering wheel of the steering system 108) causing the wheel assemblies 106 associated with steering the vehicle 102 to rotate based on the input. Thus, the input to the steering system 108 causes a change in a path or a direction of the vehicle 102 as the vehicle 102 travels along the road surface 104.

Figure 2A:
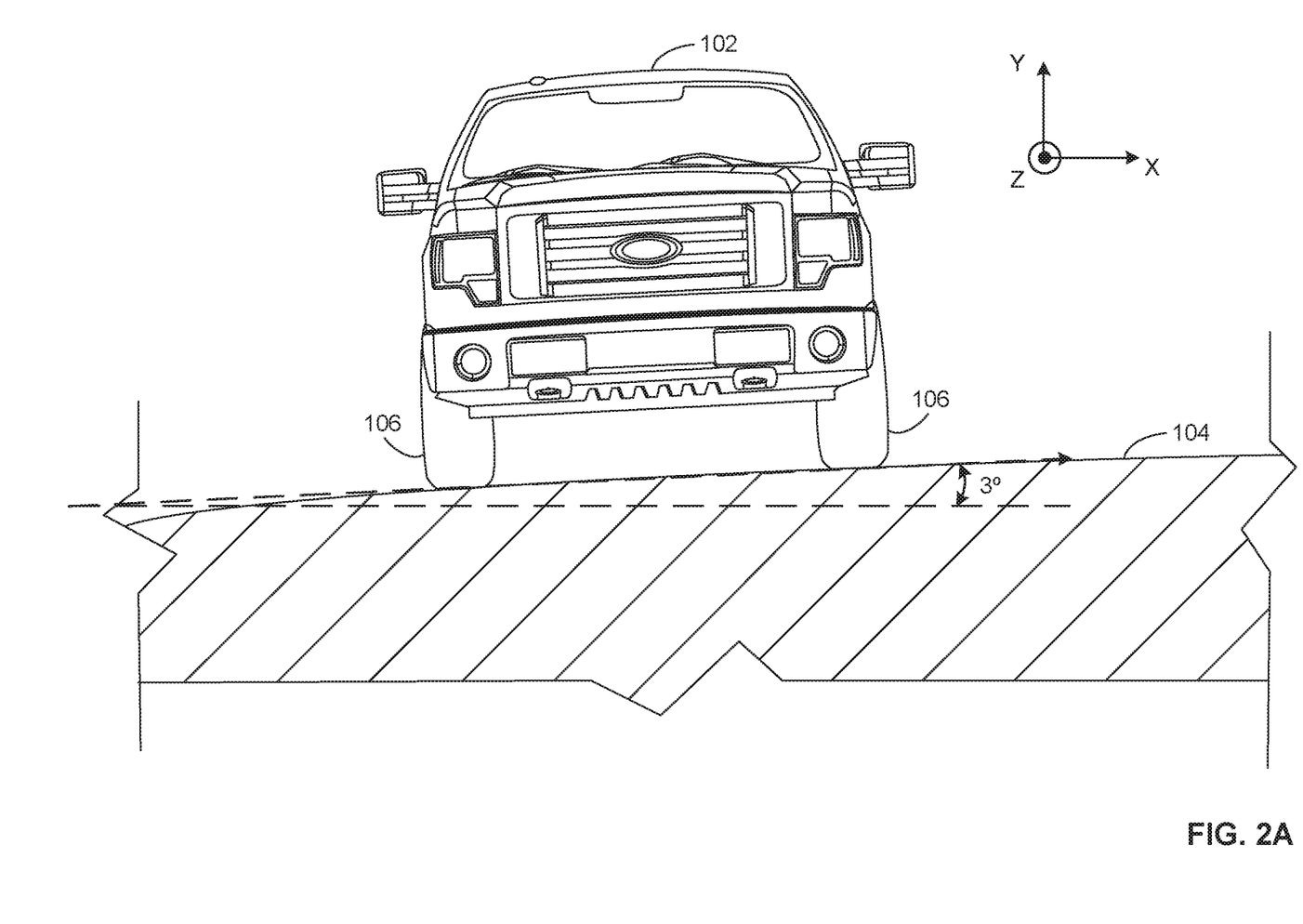
FIG. 2A is a front view of the example vehicle of FIG. 1 on an example driving surface.
Figure 2B:
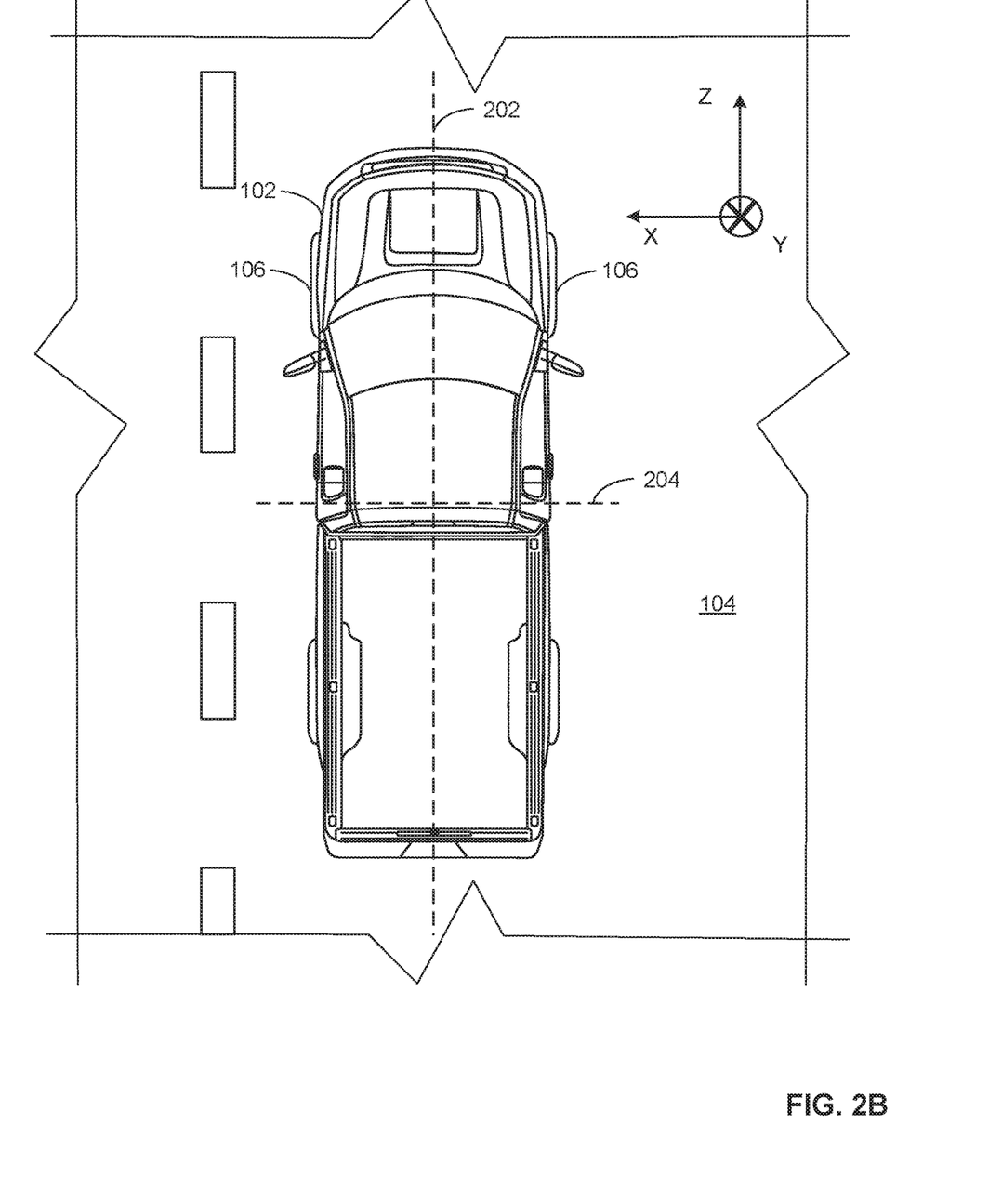
FIG. 2B is a top-view of the example vehicle of FIG. 1.

FIGS. 2A and 2B show the vehicle 102 and its wheel assemblies 106 positioned on the road surface 104 in different orientations or rotational positions. As the vehicle 102 travels along the road surface 104, certain characteristics or qualities (e.g., grades, cambers, crowns, etc.) of the road surface 104 may cause the vehicle 102 to rotate to different rotational positions (e.g., as degrees or radians) relative to the horizontal and/or the vertical. As shown in FIG. 2B, the vehicle 102 has a longitudinal or roll axis 202 extending symmetrically and/or centrally along a length of the vehicle 102. In this example, the longitudinal or roll axis 202 corresponds to a travel direction or path of the vehicle 102. Additionally, the vehicle 102 has a transverse or pitch axis 204 extending symmetrically and/or centrally along a width of the vehicle 102. The longitudinal or roll axis 202 and/or the transverse or pitch axis 204 are used to determine tilt angles of the vehicle 102 relative to the horizontal and/or the vertical. As the vehicle 102 travels along the road surface 104, the vehicle 102 can rotate about the longitudinal or roll axis 202 and/or about the transverse or pitch axis 204 which changes the tilt angles of the vehicle 102.

In some examples, the road surface 104 is not level or flat and includes a crown, a camber, a grade, a recess, etc. In some such examples, the crown or camber causes the vehicle 102 to rotate about the longitudinal or roll axis 202 to provide a first tilt angle (i.e., a roll angle) of the vehicle 102 relative to the horizontal (e.g., 3 degrees in the illustrated example of FIG. 2A). In this example, when the first tilt angle or roll angle is greater than zero, an undesired steering torque or steering pull typically causes the wheel assemblies 106 of the vehicle 102 to rotate in a first direction and/or cause the vehicle to move or veer to the left (in the orientation of FIG. 2A). Conversely, when the first tilt angle or roll angle is less than zero, the undesired steering torque or steering pull causes the wheel assemblies 106 to rotate in a second direction (e.g., opposite the first direction) and/or causes the vehicle 102 to move or veer to the right (in the orientation of FIG. 2A). The above-described undesired steering torque or steering pull prevents the vehicle 102 from traveling along a desired and/or straight path (e.g., a path parallel to the longitudinal or roll axis 202) on the road surface 104, and the wheel assemblies 106 may require a counteractive steering torque (e.g., via a steering system of the vehicle 102) to ensure the vehicle 102 travels along a desired and/or a straight path.

A magnitude or strength (e.g., 10 foot-pounds, 100 foot-pounds, etc.) of the undesired steering torque or steering pull relates to a speed of the vehicle 102 and/or braking forces applied or transmitted to the wheel assemblies 106. For example, the magnitude or strength of the undesired steering torque or steering pull can increase as a magnitude (e.g., 10 miles per hour, 20 miles per hour, etc.) of the speed of the vehicle 102 increases. In other examples, during braking operations, braking forces are applied or transmitted (e.g., via a brake fluid pressure and/or a brake system of the vehicle 102) from the road surface 104 to surfaces of the wheel assemblies 106 that contact the road surface 104 to cause the vehicle 102 to decelerate. In such examples, as a magnitude or strength (e.g., 10 pound-force, 20 pound-force, etc.) of the braking forces increase, the magnitude or strength of the undesired steering torque or steering pull may increase in response. In some such examples, these braking forces can be associated with and/or related to a brake fluid pressure (e.g., within a master cylinder) of the vehicle 102 and, thus, the undesired steering torque and/or steering pull can be associated with and/or related to the brake fluid pressure. As a magnitude or strength of the brake fluid pressure increases during operations or maneuvers of the vehicle 102, the magnitude or strength of the undesired steering torque and/or steering pull may increase in response. Additionally or alternatively, in some examples, the braking forces can be related to a deceleration of the vehicle 102. For example, as a magnitude or strength of the deceleration increases, the magnitude or strength of the undesired steering torque and/or steering pull may increase in response.

Figure 3:
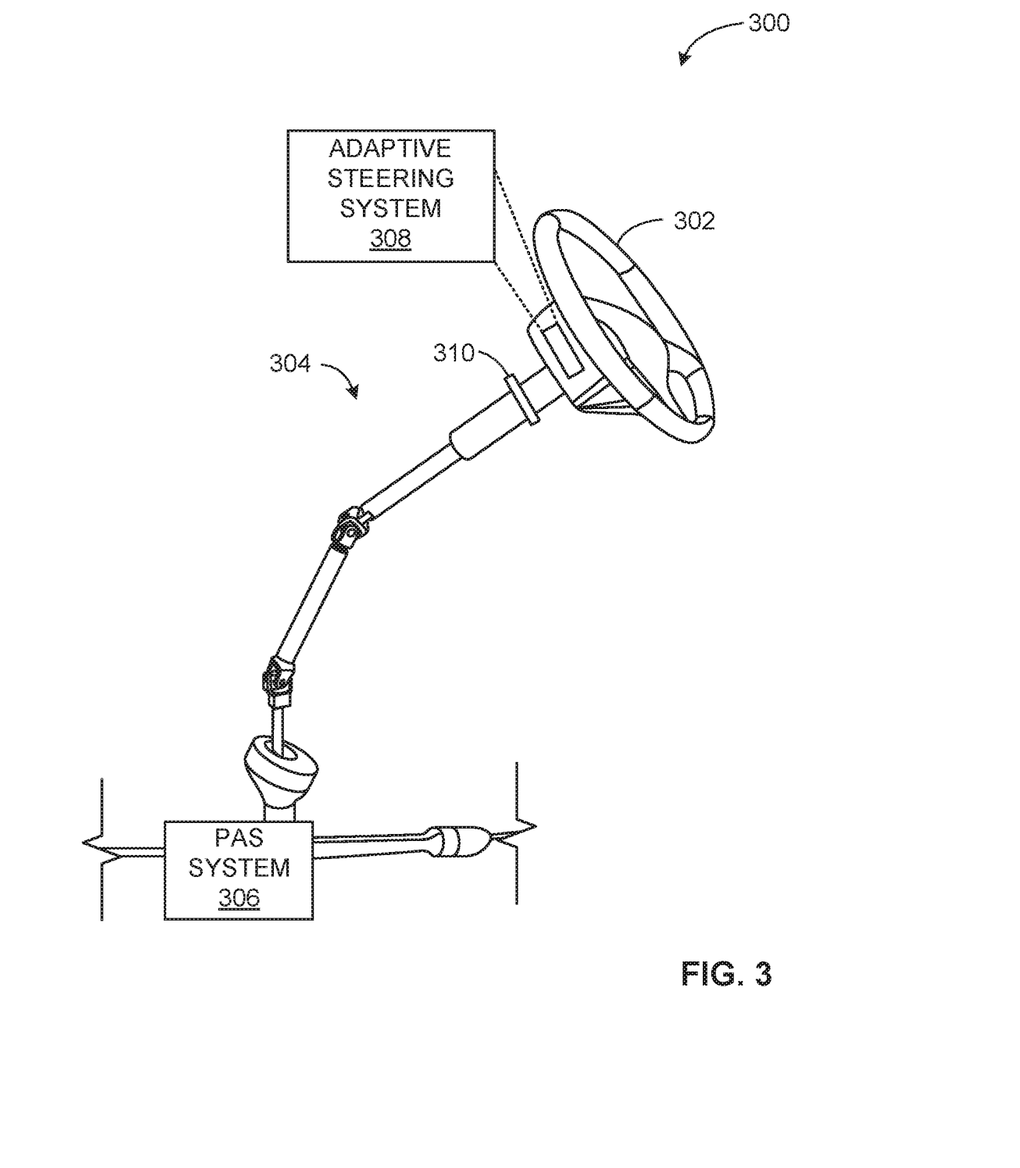
FIG. 3 is a detailed view of a portion of an example steering system of the example vehicle of FIG. 1.

FIG. 3 illustrates an example steering system 300 that may be implemented in the example vehicle 102. In the illustrated example of FIG. 3, the steering system 300 includes an example steering wheel 302 and an example steering column assembly 304 operatively coupled to the steering wheel 302. In this example, the steering column assembly 304 has a power assist steering (PAS) system 306 to facilitate an output steering torque that is transmitted to the wheel assemblies 106 based on an input torque provided to the steering column assembly 304 and/or the steering wheel 302. In some examples, the PAS system 306 controls pumps, valves and/or actuators of the steering system 300 to adjust or change the steering torque transmitted to the wheel assemblies 106 via hydraulic fluid pressure within piston cylinders or actuators and/or via tie rods or steering axles operatively coupled to the wheel assemblies 106. In other examples, the example steering system 300 includes an electric power assist steering system (EPAS) (e.g., instead of or in addition to the PAS system 306) having electric motors or actuators to facilitate the steering torque transmitted to the wheel assemblies 106 by providing and controlling a motor torque (e.g., to effect the steering column assembly 304).

Additionally or alternatively, in some examples, the example steering system 300 includes an active or adaptive steering system 308 operatively coupled to the steering wheel 302 and/or the steering column assembly 304 (e.g., resident within the steering wheel 302) to govern a relationship between rotations of the steering wheel 302 and steering torque transmitted to the wheel assemblies 106 (e.g., via the PAS system 306, an EPAS systems, etc.). In some examples, the active or adaptive steering system 308 continuously adjusts or changes the relationship based on a speed of the vehicle 102. In other examples, the active or adaptive steering system 308 applies and/or transmits a steering torque to the steering wheel 302 and/or steering column assembly 304 via a motor or actuator.

In the illustrated example of FIG. 3, the example steering system 300 may include one or more feedback sensors 310 to measure and/or determine characteristics or parameters of the steering system 300 during operations or maneuvers of the vehicle 102. For example, one or more rotational position or steering angle sensors can be coupled to the steering wheel 302 and/or the steering column assembly 304 to periodically measure and/or determine a value of a rotational position (e.g., 1 degree, 5 degrees, 10 degrees, etc.) of the steering wheel 302 and/or the steering column assembly 304. In other examples, the feedback sensor(s) 310 can be one or more torque sensors operable to periodically measure steering torque applied to the steering wheel 302 and/or the steering column assembly 304. Additionally or alternatively, the torque sensor(s) can measure and/or determine motor torque and/or an electric current of a motor (e.g., of an EPAS and/or the active or adaptive steering system 308).

While FIG. 3 illustrates an example steering system 300 that can be used to implement examples disclosed herein, other known steering systems and/or architectures may be advantageously used to control steering of the vehicle during operations or maneuvers and/or to implement the examples disclosed herein.

In example system 100 of FIG. 1, the vehicle 102 includes a vehicle controller 110 (e.g., an electronic control unit (ECU)) having a processor 112 to provide automatic functions and/or controls of the vehicle 102. For example, the vehicle controller 110 can automatically control steering torque provided and/or transmitted to the wheel assemblies 106 by providing control commands or data to the steering system 108, which is explained in greater detail below. In this example, the vehicle controller 110 is communicatively coupled to one or more sensors of the vehicle 102 such as one or more tilt sensors (e.g., accelerometers, gyroscopes, etc.) 114, brake pressure sensors (e.g., transducers, etc.) 116, speed sensors (e.g., tachometers, etc.) 118, feedback sensors (e.g., rotational position or steering angle sensors, torque sensors, etc.) 120 of the steering system 108 and/or, more generally, to one or more sensors of the vehicle 102 operable to measure and/or determine characteristics or parameters (e.g., rates and/or angles of rotation, acceleration, speed, fluid pressures, etc.) of the vehicle 102 during operations or maneuvers. In some such examples, the vehicle controller 110 may analyze and/or process data received and/or collected by the sensor(s) to determine whether and/or how to provide, update and/or change the automatic controls. For example, the vehicle controller 110 can control the steering system 108 by periodically and/or continuously increasing and/or decreasing a magnitude or strength of a pump or motor output and/or adjust a valve position or actuator based on changes of the sensor data.

In the illustrated example of FIG. 1, the tilt sensor(s) 114 may measure and/or determine (e.g., periodically or continuously) one or more of the above-described angles or tilt angles of the vehicle 102 (e.g., a rotation of the vehicle 102 about a longitudinal or roll axis of the vehicle 102). For example, the tilt sensor(s) 114 may measure and/or determine a value of a first tilt angle or roll angle (e.g., 1 degree, 5 degrees, etc.) as the vehicle 102 travels along the road surface 104. Additionally or alternatively, in other examples, the tilt sensor(s) 114 may be advantageously used to measure and/or determine a deceleration of the vehicle 102 (e.g., during braking operations). For example, the tilt sensor(s) 114 may measure and/or determine a value of deceleration (e.g., 1 meter per second per second, 5 meters per second per second, etc.) as the vehicle 102 travels along the road surface 104.

In the example system 100, the brake pressure sensor(s) 116 measure and/or determine a brake pressure (e.g. a brake fluid pressure) within the vehicle 102 (e.g. a master brake cylinder) and/or within one or more of the wheel assemblies 106 (e.g. a wheel brake cylinder). For example, the brake pressure sensor(s) 116 may measure or determine a value of a brake fluid pressure (e.g., 10 pounds per square inch, 20 pounds per square inch, etc.) within a master brake cylinder of the vehicle 102.

The speed sensor(s) 118 measure and/or determine a speed and/or speed status of the vehicle 102. For example, the speed sensor(s) 118 may measure and/or determine a value of speed (e.g., 10 miles per hour, 20 miles per hour, etc.) of the vehicle 102 and/or, more generally, whether the vehicle 102 is stationary or in a state of motion.

In the example system 100 of FIG. 1, the processor 112 includes a feedforward application 122 (e.g., installed on the processor 112) to generate instantaneous or near instantaneous control of the steering system 108 based on the above-described sensor data. For example, the processor 112 may execute the feedforward application 122 to provide and/or transmit (e.g., periodically or continuously) feedforward control commands or data to the steering system 108. The steering system 108 generates a steering torque within the steering system 108 in response to receiving the feedforward control commands or data. In some examples, a magnitude or strength of the steering torque is facilitated or controlled by the vehicle controller 110 (e.g., as the vehicle 102 travels along the road surface 104) and/or based on the feedforward control commands or data.

In some examples, the tilt sensor(s) 114 periodically or continuously measure and/or determine the tilt angle(s) of the vehicle 102 as the vehicle 102 travels along the road surface 104. In this example, as a value of the measured tilt angle increases (e.g., during a time interval), the feedforward application 122 changes or updates the feedforward control commands or data to cause the magnitude or strength of the steering torque generated by the steering system 108 to increase. Conversely, in this example, as the value of the measured tilt angle decreases, the feedforward control commands or data changes to cause the magnitude or strength of the steering torque generated by the steering system 108 to decrease in response.

In some examples, the steering torque generated by the steering system 108 and governed by the vehicle controller 110 responds linearly or proportionally to changes of the tilt angle(s) or via a fitted or superimposed function or curve based on the changes. In other examples, the magnitude or strength of the steering torque governed by the feedforward application 122 may be based on, at least partially, data received and/or collected via the brake pressure sensor(s) 116 and/or the speed sensor(s) 118, in addition to the tilt sensor(s) 114. In some such examples, the vehicle controller 110 may implement or utilize indexing methods or techniques to define unique relationships between the magnitude or strength of the steering torque, the data received via the brake pressure sensor(s) 116 (e.g., a value of brake fluid pressure), the data received via the speed sensor(s) 118 (e.g., a value of speed) and/or the other sensors of the vehicle 102. For example, the feedforward application 122 may advantageously utilize a lookup table that provides or defines a unique relationship between the magnitude or strength of the generated steering torque and the value of the speed, the brake fluid pressure (or braking force), and/or the tilt angle(s) of the vehicle 102. In some examples, the magnitude or strength of the steering torque governed by the vehicle controller 110 changes in response to changes of the value of the brake fluid pressure and/or the braking force or deceleration of the vehicle 102 (e.g., that may be increasing). In other examples, the vehicle controller 110 changes the magnitude or strength of the steering torque in response to certain values of the speed of the vehicle 102.

Additionally or alternatively, the processor 112 includes a closed loop or feedback application 124 (e.g., installed on the processor 112) to implement one or more algorithms or equations (e.g., plant and/or transfer functions), that may relate to closed loop or feedback control theory, to analyze and/or process the sensor data to further facilitate and at least partially govern the automated controls provided by the vehicle controller 110. In some examples, the processor 112 calculates and/or determines feedback control characteristics (e.g., proportional, integral and/or derivative terms). For example, the processor 112 may periodically calculate and/or determine differences between desired characteristics or parameters (e.g., pre-defined or programmed within the processor 112) of the vehicle 102 and the measured and/or determined characteristics or parameters provided by the sensor(s) of the vehicle 102. In such examples, based on the calculated and/or determined differences, the vehicle controller 110 executes (via the processor 112) the feedback application 124 to generate and/or provide feedback control commands or data, different from the feedforward control commands or data, to the steering system 108 to further control steering operations of the vehicle 102. In some examples, the vehicle controller 110 may combine one or more feedforward terms associated with the feedforward application 122 with one or more feedback terms associated with the feedback application 124 to control the steering system 108 to compensate and/or correct the undesired steering torque and/or the steering pull of the vehicle 102 due to the road surface 104 and/or certain characteristics or parameters of the vehicle 102. In some such examples, the addition of the feedforward term(s) with the feedback term(s) can reduce a response time that would have otherwise been required by feedback application 124 and/or the vehicle controller 110 to respond to the undesired steering torque and/or steering pull of the vehicle 102 in the absence of the feedforward term(s) and/or the feedforward application 122. In other examples, the feedback sensor(s) 120 (e.g., one or more torque sensors) of the steering system 108 measure and/or determine a first steering torque (e.g., generated by the steering system 108 in response to the above-described feedforward control data or commands) within the steering system 108. Based on the first steering torque, the vehicle controller 110 and/or the feedback application 124 provide feedback control commands or data to the steering system 108. The steering system 108 then generates a second steering torque based on the feedback control commands or data and/or the first steering torque. In other examples, the feedback sensor(s) can include one or more rotational position or angle sensor to measure and/or determine a steering angle associated with the steering system 108. In such examples, based on the steering angle, the vehicle controller 110 and/or the feedback application 124 provide feedback control commands or data to the steering system 108 to cause the steering system 108 to generate the second steering torque.

While an example manner of implementing the example systems 100, 300 is illustrated in FIGS. 1 and 3, one or more of the elements, processes and/or devices illustrated in FIGS. 1 and 3 may be combined, divided, re-arranged, omitted, eliminated and/or implemented in any other way. Further, the example vehicle controller 110, the processor 112 and/or, more generally, the example systems 100, 300 of FIGS. 1 and 3 may be implemented by hardware, software, firmware and/or any combination of hardware, software and/or firmware. Thus, for example, any of the example vehicle controller 110, the processor 112 and/or, more generally, the example systems 100, 300 of FIGS. 1 and 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example vehicle controller 110, the processor 112 and/or, more generally, the example systems 100, 300 of FIGS. 1 and 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example systems 100, 300 of FIGS. 1 and 3 may include one or more elements, processes and/or devices in addition to, or instead of, those illustrated in FIGS. 1 and 3, and/or may include more than one of any or all of the illustrated elements, processes and devices.

Figure 4:
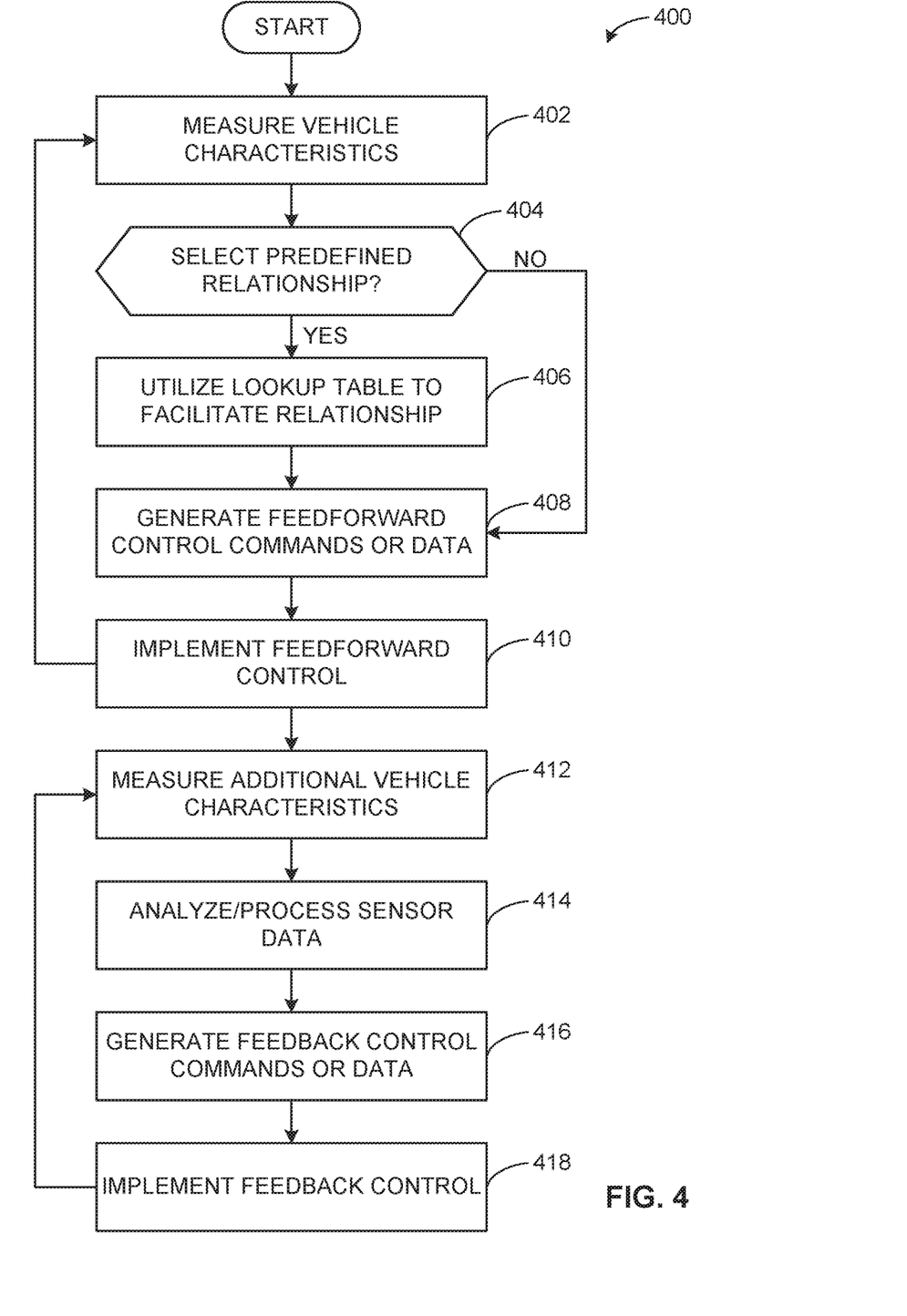
FIG. 4 is a flowchart representative of an example process that may be executed by the example system of FIG. 1 to implement the examples disclosed herein.

A flowchart representative of an example process 400 for implementing the example systems 100, 300 of FIGS. 1 and 3 is shown in FIG. 4. In this example, the process 400 may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program 400 is described with reference to the flowchart illustrated in FIG. 4, many other methods of implementing the example systems 100, 300 of FIGS. 1 and 3 may alternatively be used. For example, the order of execution of the blocks may be changed, and/or some of the blocks described may be changed, eliminated, or combined.

As mentioned above, the example process 400 of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process 400 of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals or carrier waves and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 4 illustrates a flowchart representative of an example process 400 that can be implemented to automatically compensate and/or correct undesired steering torque or steering pull and/or, more generally, automatically control steering during operations or maneuvers of vehicles or automobiles. The example process 400 can be implemented using the example vehicle 102, the vehicle controller 110 and/or, more generally, the example systems 100, 300 shown in FIGS. 1 and 3. The example process 400 of FIG. 4 begins by measuring and/or determining characteristics or parameters (e.g., tilt angles, speed, fluid pressure, braking force, etc.) of the vehicle 102 during operations or maneuvers and/or while the vehicle 102 is traveling along the road surface 104 (block 402). In some examples, one or more of the sensors (e.g., the tilt sensor(s) 114, the brake pressure sensor(s) 116, the speed sensor(s) 118, the feedback sensor(s) 120, etc.) operatively coupled to the vehicle 102 measure and/or determine (e.g., periodically or continuously) the characteristics or parameters. The vehicle controller 110 is communicatively coupled to the sensor(s) of the vehicle 102 to receive data from the sensor(s) that may correspond to the measured and/or determined characteristics or parameters. For example, the tilt sensor(s) 114 (e.g., one or more accelerometers, gyroscopes, etc.) can measure and/or determine one or more tilt angles while the vehicle 102 is positioned on and/or traveling along the road surface 104. The tilt angle(s) can include a rotation of the vehicle 102 about a longitudinal or roll axis (e.g., the longitudinal or roll axis 202) of the vehicle 102. Additionally or alternatively, the tilt angle(s) may include a rotation of the vehicle 102 about a transverse or pitch axis (e.g., the transverse or pitch axis 204) of the vehicle 102. In any case, the tilt sensor(s) 114 generate corresponding data (e.g., a value of rotation as degrees or radians) and transmit or provide the data to the vehicle controller 110. The vehicle controller 110 can receive this data continuously or periodically (e.g., every 1 second, 0.1 seconds, etc.). In some other examples, during braking operations of the vehicle 102, the vehicle controller 110 receives data from the brake pressure sensor(s) 116. For example, the brake pressure sensor(s) 116 measure and/or determine a brake fluid pressure of the vehicle 102 and transmit corresponding data (e.g., a value of brake fluid pressure) to the vehicle controller 110. In another example, the speed sensor(s) 118 measure and/or determine a speed of the vehicle 102 during operations or maneuvers and transmit corresponding data (e.g., a value of speed) to the vehicle controller 110.

In some examples, the road surface 104 is not level or flat and includes a camber or crown. The camber, the crown and/or, more generally, the not level or flat road surface 104 can provide and/or define the tilt angle(s) when the vehicle 102 is positioned on the road surface 104. Additionally, the road surface 104 can cause the tilt angle(s) to vary or change (e.g., increase and/or decrease) during time intervals associated with the traveling vehicle 102. The vehicle controller 110 can detect and/or determine these changes of the tilt angle(s) instantaneously or near instantaneously via the data received from the sensor(s). In other examples, other characteristics or parameters (e.g., brake fluid pressure, deceleration, speed, etc.) vary or change during the time intervals and can be detected and/or determined by the vehicle controller 110.

The example process 400 also includes determining, for example, via the vehicle controller 110, whether to select and/or implement pre-defined relationships that may be accessible and/or resident, for example, on the processor 112 (block 404). For example, the speed, the brake pressure, the deceleration, and/or undesired steering torque or steering pull of the vehicle 102 can have a unique and/or independent relationship with a certain desired steering torque that is necessary or required to counteract, reduce and/or eliminate the undesired steering torque or steering pull and ensure the vehicle 102 travels along a desired path (e.g., a straight path and/or a path along a longitudinal or roll axis of the vehicle 102). If the vehicle controller 110 determines to select a pre-defined relationship (block 404), the vehicle controller 110 facilitates the relationships by utilizing and/or implementing one or more indexing methods or techniques, such as, for example, by using a lookup table, which is a reference source containing data of these relationships (block 406). Alternatively, if the vehicle controller 110 determines not to select one or more pre-defined relationships (block 404), control proceeds to block 408, as discussed below.

When the vehicle controller 110 facilitates the selected one or more relationships between the desired steering torque that may be required or needed by the vehicle 102 and the measured and/or determined characteristics or parameters of the vehicle 102 (block 406), the vehicle controller 110 advantageously utilizes the lookup table to provide and/or facilitate a unique relationship between one or more of a value of the desired steering torque, a value of the speed, a value of the braking fluid pressure, a value of the deceleration, and/or a value of the tilt angle(s) of the vehicle 102. In such examples, the vehicle controller 110 determines the value of the desired steering torque based on, at least partially, data received via the brake pressure sensor(s) 116 and/or the speed sensor(s) 118, in addition to the tilt sensor(s) 114. In some examples, as the value of the brake fluid pressure of the vehicle 102 increases, the vehicle controller 110 updates the value of the desired steering torque to increase in response by using the lookup table. In other examples, as the value of the speed of the vehicle 102 increases, the vehicle controller 110 updates the value of the desired steering torque to increase in response. In other examples, as the value of the tilt angle(s) increases, the vehicle controller 110 updates the value of the desired steering torque to increase in response. More generally, as the values of the characteristics or parameters of the vehicle 102 change, the vehicle controller 110 changes the value of the desired steering torque by using the lookup table (or other indexing methods and/or techniques). The vehicle controller 110 can use the above-described determined values of the characteristics or parameters and/or the desired steering torque to generate and/or update feedforward control commands or data (block 408).

To generate the feedforward control commands or data (block 408), the vehicle controller 110 executes (e.g., via the processor 112) the feedforward application 122 using the measurements, determinations and/or data received by the vehicle controller 110 (block 402) and/or data based on the pre-defined relationships disclosed above (block 406). In some examples, the feedforward application 122 generates the feedforward control commands or data based on the measured and/or determined tilt angle(s) of the vehicle 102. In other examples, the feedforward control commands or data are based on the brake fluid pressure, the deceleration, the speed and/or the desired steering torque of the vehicle 102.

After generating the feedforward control commands or data, the vehicle controller 110 can provide and/or transmit the feedforward control commands or data to the steering system 108 to control the wheel assemblies 106 and implement the feedforward control (block 410). In some examples, the vehicle controller 110 can rapidly update the feedforward control commands or data based on changes of the characteristics or parameters of the vehicle 102. As mentioned above, the measured and/or determined characteristics or parameters of the vehicle 102 can increase and/or decrease as the vehicle 102 travels along the road surface 104. In some such examples, as the value of the tilt angle(s) increases (e.g., greater than zero) and/or decreases or approaches zero during a time interval, the vehicle controller 110 rapidly changes or updates the feedforward control commands or data in response, which can effect changes within the steering system 108 while the wheel assemblies 106 are controlled by the steering system 108. In other examples, the vehicle controller 110 changes or updates the feedforward control commands or data based on the brake fluid pressure, the deceleration, and/or the speed of the vehicle 102.

In some examples, after generating and/or updating the feedforward control commands or data (block 408), the vehicle controller 110 provides and/or transmits the feedforward control commands or data to the steering system 108 to implement the feedforward control (block 410) via the feedforward application 122. The steering system 108 is communicatively coupled to the vehicle controller 110 to receive the feedforward control commands or data. After receiving the feedforward control commands or data, the steering system 108 generates a first steering torque having a magnitude or strength based on the feedforward control commands or data. For example, a PAS system (e.g., the PAS system 306) associated with the steering system 108 can enable the wheel assemblies 106 to rotate and/or, more generally, can provide and/or transmit the first steering torque to the wheel assemblies 106 based on the feedforward control commands or data. In another example, an EPAS system associated with the steering system 108 provides the first steering torque to the wheel assemblies 106 based on the feedforward control commands or data. In another example, an active or adaptive steering system (e.g., the active or adaptive steering system 308) associated with the steering system 108 provides the first steering torque to the wheel assemblies 106.

In some examples, the vehicle controller 110 governs the magnitude or strength of the first steering torque based on the updated feedforward control commands or data. For example, based on a change (e.g., an increase) of the value of the tilt angle(s) of the vehicle 102, the steering system 108 causes the first steering torque to change (e.g., increase) in response to and/or based on the updated feedforward control commands or data. In some such examples, as the value of the tilt angle(s) increases linearly and/or proportionally, the vehicle controller 110 controls the steering system 108, via the feedforward control commands or data, to cause the magnitude or strength of the first steering torque to increase linearly and/or proportionally in response. In other examples, the vehicle controller 110 governs the magnitude or strength of the first steering torque based on the value of the brake pressure, the deceleration, the speed and/or the desired steering torque determined at block 406. For example, based on the value and/or a change of the value of the brake fluid pressure of the vehicle 102, the vehicle controller 110 controls the steering system 108, via the feedforward control commands or data, to causes the first steering torque to change in response. In some such examples, as the value of the brake fluid pressure increases, the vehicle controller 110 causes the magnitude or strength of the first steering torque to increase in response. In another example, based on the value and/or a change of the value of the speed of the vehicle 102, the vehicle controller 110 controls the steering system 108, via the feedforward control commands or data, to causes the first steering torque to change in response. In some such examples, as the value of the speed increases, the vehicle controller 110 causes the magnitude or strength of the first steering torque to increase in response.

After the steering system 108 generates and/or changes the first steering torque, e.g. implements the feedforward control (block 410), the example process 400 returns to continuing measuring and/or determining characteristics or parameters of the vehicle 102 (block 402) for further feedforward control. Additionally, during the subsequent feedforward control operations, the example process 400 continues to measure and/or determine additional vehicle characteristics or parameters (block 412) for feedback control operations.

As noted above, the sensor(s) of the vehicle 102 measure and/or determine additional characteristics or parameter of the vehicle 102 (block 412). In some examples, the feedback sensor(s) 120 (e.g., one or more torque sensors) of the steering system 108 measure and/or determine a steering torque within the steering system 108. For example, the feedback sensor(s) 120 measure and/or determine the first steering torque generated and/or changed by the steering system 108 after implementation of the feedforward control (block 410). In other examples, the feedback sensor(s) includes a rotational position and/or angle sensor to measure and/or determine a steering angle associated with the steering system 108.

The example process 400 also includes analyzing and/or processing the sensor data (block 414). For example, the vehicle controller 110 analyzes and/or processes the additional vehicle characteristics and/or parameters (block 412) to compare the additional characteristics and/or parameters of the vehicle to desired characteristics or parameters (e.g., pre-defined and/or programmed within the processor 112). For example, as the additional characteristics or parameters of the vehicle 102 rapidly and/or periodically change or fluctuate, the vehicle controller 110 determines (e.g., via calculations) differences and/or errors between the additional characteristics or parameters of the vehicle 102 and the desired characteristics or parameters.

After determining the differences and/or errors, the example process 400 generates feedback control commands or data (block 416). For example, the vehicle controller 110 executes (e.g., via the processor 112) the feedback application 124 to generate the feedback control commands or data (block 416), different from the feedforward control commands or data, based on the analyzed and/or processed data (block 414). For example, when the above-described errors or differences have values greater or less than zero, the feedback application 124 can generate feedback control commands or data in response. In some such examples, the vehicle controller 110 may implement one or more algorithms or equations relating to control theory, such as plant or transfer functions, to generate the feedback control commands or data via the feedback application 124.

To implement the feedback control commands or data (block 418), the vehicle controller 110 provides and/or transmits the feedback control commands or data to the steering system 108 to further control steering operations of the vehicle 102. For example, the vehicle controller 110 implements feedback control to control the steering system 108 of the vehicle 102 via the feedback application 124. After receiving the feedback control commands or data, the steering system 108 generates a second steering torque, different from the first steering torque, based on the feedback control commands or data. The steering system 108 then provides and/or transmits the second steering torque to the wheel assemblies 106. In some such examples, the second steering torque can have a magnitude or strength based on the feedback control commands or data.

After the steering system 108 generates the second steering torque to implement the feedback control (block 418), the example process 400 returns to continuing measuring and/or determining additional vehicle characteristics (block 412) for continued feedforward operations.

In some examples, the vehicle controller 110 combines the feedforward term(s) and feedback term(s) to provide a corrective steering toque or angle that results in a reduced level of steering wheel pull due to road conditions and vehicle acceleration and/or deceleration. The addition of feedforward information can reduce the response time of the feedback control working alone.

Figure 5:
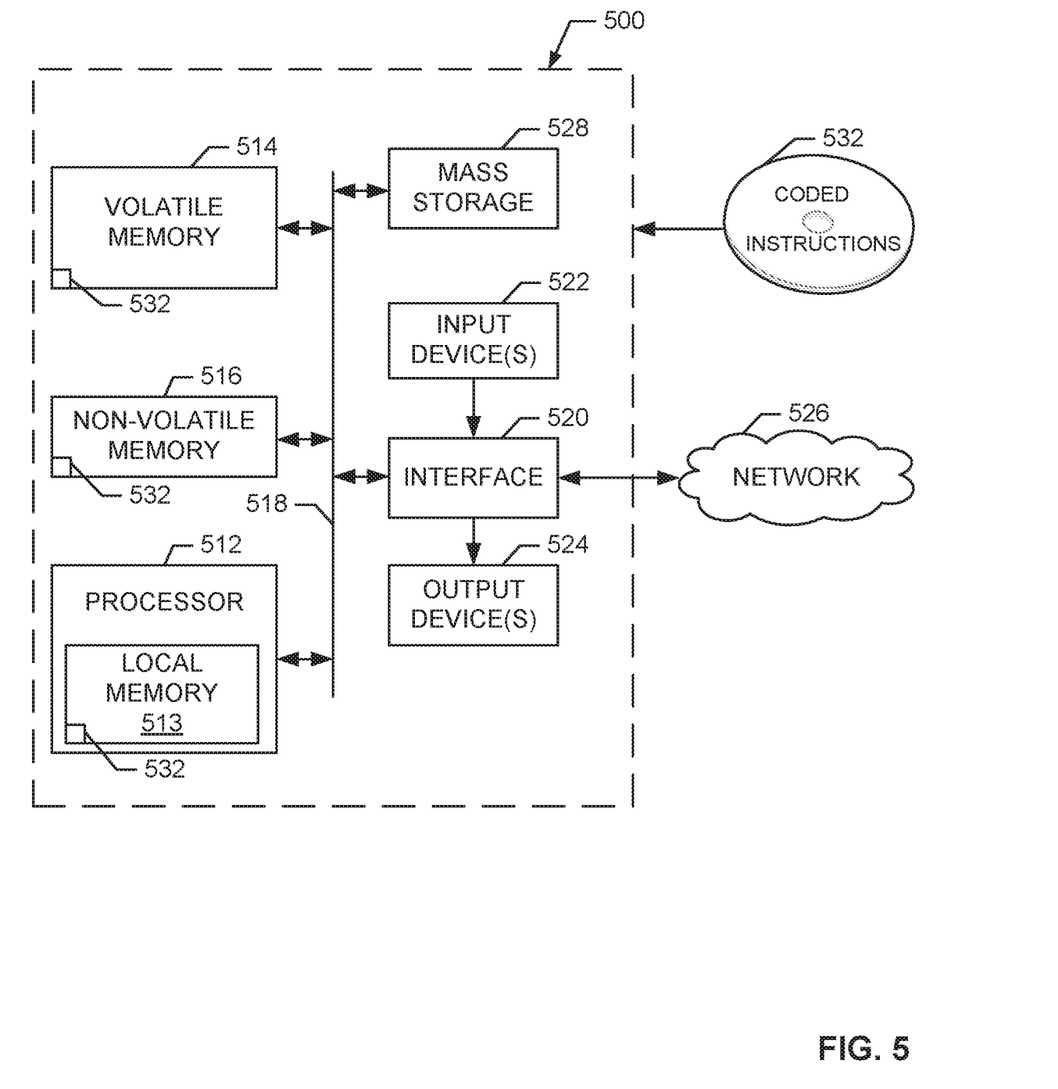
FIG. 5 is a block diagram of an example processing platform capable of executing example machine-readable instructions to implement the process of FIG. 4 and/or the example system of FIG. 1.

FIG. 5 is a block diagram of an example processor platform 500 capable of executing the instructions to implement the method of FIG. 4 and the example systems 100, 300 of FIGS. 1 and 3. The processor platform 500 can be, for example, a server, a personal computer, a mobile device (e.g., a cell phone, a smart phone, etc.) or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad-and/or a voice recognition system.

One or more output devices 524 are also connected to the interface circuit 520 of the illustrated example. The output devices 524 can be implemented, for example, by display devices (e.g., a light emitting diode (LED), a liquid crystal display, a touchscreen, speakers, etc.). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 to implement the method of FIG. 2 may be stored in the mass storage device 528, in the volatile memory 514, in the non-volatile memory 516, and/or on a removable tangible computer readable storage medium such as a CD or DVD.

From the foregoing, it will be appreciated that the above disclosed methods and apparatus automatically control steering of automobiles or vehicles during operations or maneuvers. The examples disclosed herein rapidly control, compensate and/or correct undesired steering torque or steering pull of a vehicle within a time interval that would have otherwise been unachievable. Examples disclosed herein periodically measure a tilt angle associated with the vehicle positioned on and/or traveling along a road surface. Examples disclosed herein periodically and/or continuously generate feedforward control commands or data, different from feedback control commands or data, to control or govern the steering system based on the measured tilt angle. In some disclosed examples, the vehicle controller adjusts or updates the feedforward control commands or data to enable to the steering system to rapidly adjust or update a magnitude or strength of the counteractive steering torque based on a speed, deceleration and/or braking fluid pressure of the vehicle. In other disclosed examples, feedback control commands or data are periodically or continuously generated via the vehicle controller to provide additional control for the steering system and generate an additional steering torque based on feedback sensors of the steering system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first sensor to measure a tilt angle associated with a vehicle positioned on a road surface;
a steering system;
a vehicle controller to (1) provide a feedforward command to the steering system based on the tilt angle, the steering system to generate a first steering torque, a magnitude of the first steering torque proportional to the tilt angle, and (2), responsive to receiving a measurement of the first steering torque associated with the feedforward command, provide a feedback command to the steering system based on the first steering torque, the steering system to generate a second steering torque in response to the feedback command; and
a second sensor communicatively coupled to the vehicle controller to measure a speed of the vehicle, the vehicle controller to update the feedforward command based on the speed, the updated feedforward command to increase the magnitude of the first steering torque generated by the steering system when the speed of the vehicle increases.

2. The apparatus of claim 1, wherein the tilt angle includes a rotation of the vehicle about a longitudinal axis of the vehicle.

3. The apparatus of claim 1, wherein the first sensor includes a gyroscope or an accelerometer.

4. The apparatus of claim 1, wherein the road surface includes a crown, the vehicle positioned on the crown to provide the tilt angle.

5. The apparatus of claim 1, wherein the first sensor is to periodically or continuously measure the tilt angle as the vehicle moves along the road surface, the vehicle controller to update the feedforward command based on a change of the tilt angle, the steering system to change the first steering torque based on the updated feedforward command.

6. The apparatus of claim 1, further including a third sensor communicatively coupled to the vehicle controller to measure the first steering torque.

7. The apparatus of claim 1, further including a third sensor communicatively coupled to the vehicle controller to measure a deceleration of the vehicle, the vehicle controller to update the feedforward command based on the deceleration, the steering system to change the first steering torque based on the updated feedforward command.

8. The apparatus of claim 1, further including a third sensor communicatively coupled to the vehicle controller to measure a brake pressure of the vehicle, the vehicle controller to update the feedforward command based on the brake pressure, the steering system to change the first steering torque based on the updated feedforward command.

9. The apparatus of claim 1, wherein the vehicle controller is to execute a feedforward application to generate the feedforward command different from the feedback command.

10. The apparatus of claim 9, wherein the vehicle controller is to execute a feedback application to generate the feedback command different from the feedforward command, the vehicle controller to control the steering system based on a combination of the feedforward command and the feedback command.

11. The apparatus of claim 8, wherein the steering system is to increase the first steering torque when the brake pressure increases.

12. A method comprising:
measuring a tilt angle associated with a vehicle on a surface via a first sensor;
measuring a speed of the vehicle via a second sensor;
providing a feedforward command to a steering system of the vehicle based on the tilt angle and the speed of the vehicle to generate a first steering torque, a magnitude of the first steering torque directly proportional to the tilt angle, the magnitude of the first steering torque to increase when the speed of the vehicle increases; and
responsive to receiving a measurement of the first steering torque associated with the feedforward command, providing a feedback command to the steering system based on the first steering torque to generate a second steering torque.

13. The method of claim 12, wherein the tilt angle includes a rotation of the vehicle about a longitudinal axis of the vehicle.

14. The method of claim 12, wherein the surface includes a crown, the vehicle positioned on the crown to provide the tilt angle.

15. The method of claim 12, further including:
periodically measuring, via the first sensor, the tilt angle as the vehicle moves along the surface; and
updating the feedforward command based on a change of the tilt angle, the steering system to change the first steering torque based on the updated feedforward command.

16. The method of claim 12, further including measuring the first steering torque via a third sensor communicatively coupled to a vehicle controller.

17. The method of claim 12, further including measuring a brake pressure of the vehicle via a third sensor communicatively coupled to a vehicle controller, the vehicle controller to update the feedforward command based on the brake pressure, the steering system to change the first steering torque based on the updated feedforward command.

18. The method of claim 17, wherein the steering system is to increase the first steering torque when the brake pressure increases.

19. A tangible machine-readable medium comprising instructions which, when executed, cause a processor to:
determine a tilt angle associated with a vehicle positioned on a road surface via a first sensor, the first sensor to measure the tilt angle;
determine a speed of the vehicle via a second sensor;
provide a feedforward command to a steering system of the vehicle based on the tilt angle and the speed of the vehicle, the steering system to generate a first steering torque in response to receiving the feedforward command, a magnitude of the first steering torque increasing linearly with the tilt angle, the first steering torque to increase when the speed of the vehicle increases; and
responsive to receiving a measurement of the first steering torque associated with the feedforward command, provide a feedback command to the steering system based on the first steering torque to generate a second steering torque.

20. The tangible machine-readable medium of claim 19, wherein the tilt angle includes a rotation of the vehicle about a longitudinal axis of the vehicle.

21. The tangible machine-readable medium of claim 19, further including instructions which, when executed, cause the processor to:
periodically determine the tilt angle as the vehicle moves along the road surface via the first sensor; and
update the feedforward command based on a change of the tilt angle, the steering system to change the first steering torque based on the updated feedforward command.

22. The tangible machine-readable medium of claim 19, further including instructions which, when executed, cause the processor to determine the first steering torque via a third sensor, the third sensor to measure the first steering torque.

* * * * *